(12) United States Patent
Alasti et al.

(10) Patent No.: US 12,495,396 B2
(45) Date of Patent: Dec. 9, 2025

(54) ASSIGNING UPLINK AND DOWNLINK RESOURCES WITHIN BANDWIDTH PARTS

(71) Applicant: DISH WIRELESS L.L.C., Englewood, CO (US)

(72) Inventors: Mehdi Alasti, Reston, VA (US); Jingyi Zhou, Belle Mead, NJ (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 586 days.

(21) Appl. No.: 17/992,064

(22) Filed: Nov. 22, 2022

(65) Prior Publication Data

US 2024/0172181 A1    May 23, 2024

(51) Int. Cl.
| | |
|---|---|
| H04W 4/00 | (2018.01) |
| H04L 5/14 | (2006.01) |
| H04L 27/26 | (2006.01) |
| H04W 72/02 | (2009.01) |
| H04W 72/044 | (2023.01) |

(52) U.S. Cl.
CPC ............... H04W 72/02 (2013.01); H04L 5/14 (2013.01); H04L 27/26025 (2021.01); H04W 72/044 (2013.01)

(58) Field of Classification Search
CPC ...... H04W 72/02; H04W 72/044; H04L 5/14; H04L 27/26025; H04L 5/0005; H04L 5/0044; H04L 5/001
See application file for complete search history.

(56) References Cited

U.S. PATENT DOCUMENTS

| | | |
|---|---|---|
| 10,912,110 B2 | 2/2021 | Shaheen et al. |
| 11,109,382 B2 | 8/2021 | Bassirat et al. |
| 11,277,197 B2 | 3/2022 | Alasti et al. |
| 11,411,639 B2 | 8/2022 | Sorond et al. |
| 2016/0380745 A1 | 12/2016 | Wu et al. |

(Continued)

OTHER PUBLICATIONS

Cuttrer, David , et al., "Boosting 5G Network Performance Using Self Interference Cancellation", Microwave Journal, Feb. 11, 2022, 11 pages.

(Continued)

Primary Examiner — Sithu Ko
Assistant Examiner — Hidayat Dabiri
(74) Attorney, Agent, or Firm — Jeremiah J. Baunach; Frontier IP Law PLLC

(57) ABSTRACT

Uplink and downlink resources within a wireless network are assigned such that full duplex operation is enabled within a bandwidth parts. A first bandwidth part and non-overlapping second bandwidth part are assigned for use by respective first and second groups of user equipment. Uplink resources and downlink resources are also allocated within each bandwidth part. The uplink and downlink resources may be specified by a subband within the each bandwidth part and a timeslot, to thereby enable duplex operation of the first group of user equipment. Communications are then performed with the first group of user equipment using the uplink and downlink resources of first bandwidth part and communication with the second group of user equipment is performed using the uplink and downlink resources of the second bandwidth part.

20 Claims, 5 Drawing Sheets

(56) References Cited

U.S. PATENT DOCUMENTS

| | | | |
|---|---|---|---|
| 2021/0029697 A1 | 1/2021 | Bassirat et al. | |
| 2021/0360613 A1* | 11/2021 | Bassirat | H04B 17/318 |
| 2022/0007395 A1* | 1/2022 | Lei | H04L 1/0003 |
| 2022/0116948 A1 | 4/2022 | Immonen et al. | |
| 2022/0132494 A1* | 4/2022 | Kumar | H04W 52/0277 |

OTHER PUBLICATIONS

Guimarães, Francisco Rafael Vasconcelos, et al., "Interference Management for 4G Cellular Networks and Beyond", Universidade Federal do Ceará, Centro de Tecnologia Departamento de Engenharia de Teleinformática Programa de Pós-Graduação em Engenharia de Teleinformatica, 2018, pp. 1-113.

Liberg, Olof, et al., "Physical Resource Block LTE-M", ScienceDirect; Cellular Internet of Things (Second Edition), 2020, 21 pages.

Lin, Xingqin, et al., "A Primer on Bandwidth Parts in 5G New Radio", Ericsson, Aug. 29, 2022, 7 pages.

Lin, Xingquin, et al., "An Overview of 5G Advanced Evolution in 3FPP Release 18", IEEE, Aug. 26, 2022, 8 pages.

Montojo, Juan, "Setting off the 5G Advanced evolution", OnQ Blog; Qualcomm Technologies, Inc., Dec. 9, 2021, 8 pages.

Wang, Fei, et al., "New SI: Study on evolution of NR duplex operation", CMCC (Moderator); Agenda Item: 8.6.1; Electronic Meeting, revision of RP-213586, Dec. 6, 2021, 5 pages.

* cited by examiner

ASSIGNING UPLINK AND DOWNLINK RESOURCES WITHIN BANDWIDTH PARTS

TECHNICAL FIELD

This patent relates to mobile wireless communication systems, and more particularly relates to techniques for assigning uplink and downlink resources within bandwidth parts.

BACKGROUND

The Third Generation Partnership Project (3GPP) Radio Access Network (RAN) working group recently approved its Release 18, generally considered as the initial version of what is now known as the 5G Advanced wireless communication specification. Release 18 is expected to significantly boost 5G performance and support a wide variety of new use cases. These include new operational frequency bands, energy savings, network coverage, mobility improvements, Multiple Input Multiple Output (MIMO) antennas, and positioning services. Support is also provided for Ultra Reliable Low Latency Communication (URLLC), Reduced Capability (RedCap) devices, broadcast services, and Non-Terrestrial Networks (NTNs).

Release 18 continues to treat radio spectrum as a scarce resource. Therefore, further enhancements enable greater flexibility in the use of spectrum. One of these enhancements is the ability for a base station (gNodeB) to operate in full duplex mode. More specifically, Release 18 considers the feasibility of allowing the coexistence of downlink and uplink at the same time within a conventional Time Division Duplex (TDD) channel bandwidth. With one suggested approach, the TDD channel bandwidth is divided into non-overlapping subbands, and timeslots are divided between downlink and uplink.

SUMMARY OF PREFERRED EMBODIMENTS

Preferred embodiments of the methods, apparatus and systems described herein provide for assignment of uplink and downlink radio resources such that full duplex operation is enabled within bandwidth parts.

More particularly, a first bandwidth part and second bandwidth part are established to implement wireless communication. The second bandwidth part is implemented concurrently with the first bandwidth part, and such that the second bandwidth part is non-overlapping in frequency with the first bandwidth part. The first bandwidth part is assigned for use by a first group of user equipment, and the second bandwidth part assigned for use by a second group of user equipment. Uplink resources and downlink resources are allocated within the first bandwidth part for use by the first group of user equipment. The uplink and downlink resources may be specified by a subband within the first bandwidth part and a timeslot, to thereby enable duplex operation of the first group of user equipment. Similarly, uplink resources and downlink resources are allocated within the second bandwidth part for use by the second group of user equipment, with the uplink and downlink resources specified by a subband within the second bandwidth part and timeslots, to thereby enable duplex operation of the second group of user equipment. Communications are then performed with the first group of user equipment using the uplink and downlink resources of first bandwidth part and communication with the second group of user equipment using the uplink and downlink resources of the second bandwidth part.

An operator of the wireless network may determine parameters of the first bandwidth part and the second bandwidth part, the parameters including subband frequencies and subband spacings of each bandwidth part.

The first bandwidth part may be assigned for use by a first enterprise and the second bandwidth part may be assigned for use by a second enterprise. The term "enterprise", as used herein, should be construed to include any mobile "service provider" that provides or sells wireless connectivity to users for cellphone data and telephone calls. An "enterprise" in some implementations, may be a mobile network operator (MNO), a mobile carrier, cellular company or wireless service provider. However, in other instances, the enterprise may be a Mobile Virtual Network Operator (MNVO), a Non-Public Network (NPN), a municipality such as a city, a university campus, a corporate office location, or any other entity that provides wireless service to end users.

The system may define parameters of the first uplink resource and first downlink resource for use by a first enterprise, and may define parameters of the second uplink resource and second downlink resource for use by a second enterprise.

In some embodiments, the first bandwidth part may be based on one or more predetermined operating frequencies of the first group of user equipment. The second bandwidth part may be selected with a different bandwidth than the first bandwidth part and the second bandwidth part may be based on one or more predetermined operating frequencies of the second group of user equipment.

A subcarrier spacing of the first bandwidth part may be different from a subcarrier spacing of the second bandwidth part.

In one example implementation, for each user equipment and on each carrier component, up to four (4) download bandwidth parts and up to four (4) upload bandwidth parts can be defined. In some example implementations, a given user equipment may only have one active download bandwidth part and only one active download bandwidth part at a given time. However other arrangements are possible.

In some embodiments, parameters of the first bandwidth part, first uplink resource (and first downlink resource) are communicated to the first group of user equipment, and parameters of the second bandwidth part, second uplink resource (and second downlink resource) are communicated to the second group of user equipment.

The parameters of the first bandwidth part, first uplink resources, (first downlink resources) may be communicated via a first radio resource control (RRC) message, and parameters of the second bandwidth part, second uplink resources (and second downlink resources) communicated via a second RRC message.

In some embodiments, a third bandwidth part also implements wireless communication, where the third bandwidth part is implemented concurrently with the first and second bandwidth parts, and the third bandwidth part non-overlapping in frequency with both the first and second bandwidth parts. In this instance, the third bandwidth part is used by a third group of user equipment. A third uplink resource and a third downlink resource within the third bandwidth part are assigned for use by the third group of user equipment, with the third uplink resource and third downlink resource each specified by a subband within the third bandwidth part and a timeslot.

BRIEF DESCRIPTION OF THE DRAWINGS

Additional novel features and advantages of the approaches discussed herein are evident from the text that follows and the accompanying drawings, where.

DETAILED DESCRIPTION OF ILLUSTRATIVE EMBODIMENT(S)

Figure 1:
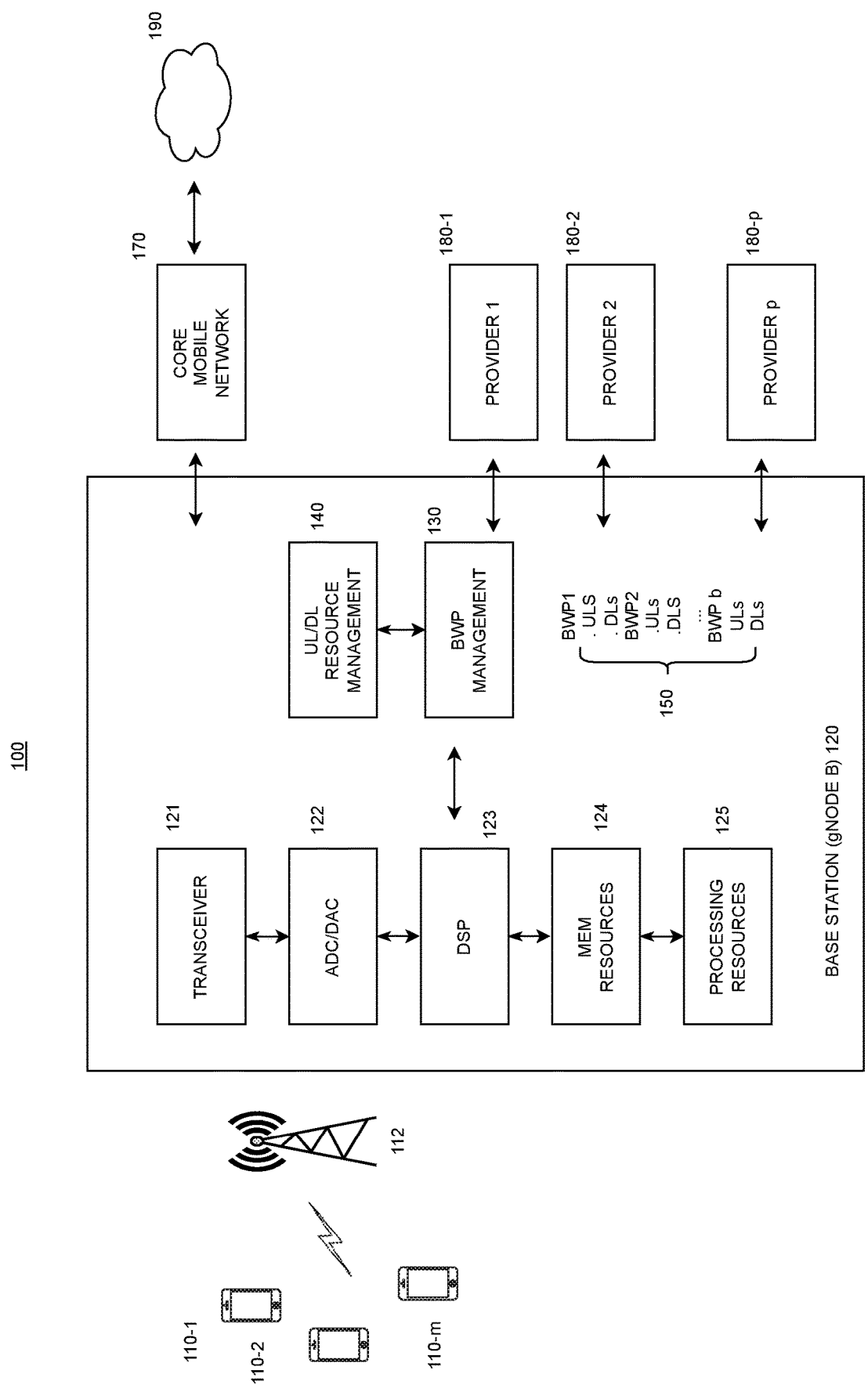
FIG. 1 is a block diagram of a mobile wireless communication system that assigns uplink and downlink resources within bandwidth parts.

FIG. 1 is a block diagram of a wireless communication system 100, according to one embodiment. The wireless communication system 100 includes multiple user equipment (UE) 110-1, 110-2, . . . , 110-$m$, a base station antenna 112 and a base station 120. The base station 120 enables the UEs 110 to communicate with other UEs 110 or to send and receive data and/or voice via other networks 190 such as the Internet and/or voice networks.

The base station 120 includes a transceiver 121, Analog to Digital (ADC) and Digital to Analog (DAC) converters 122, Digital Signal Processor(s) (DSPs) 123, memory resources 124, and processing resources 125. The transceiver 121 transmits and receives mobile communication signals to and from the UE 110 via antenna(s) 112, and to and from other base stations, and to and from other communication systems 190. The ADC and DAC 122 convert the analog signals needed by the transceiver 121 to digital signals processed by the DSPs 123.

The memory resources 124 include one or more computer readable media that store software instructions for establishing a mobile communication network with the base station 120. The processing resources 125 execute the instructions stored in one or more computer readable media of the memory resources 124 to process the signals provided by and to the DSPs 123. As set forth in more detail below, execution of the software instructions also causes the BWP Management 130 and UL/DL Resource Management 140 to establish uplink and downlink resources on bandwidth parts (BWPs).

The memory resources 124 and processing resources 125 may be implemented as one or more special-purpose or general-purpose processors. Such special-purpose processors may include processors that are specifically designed to perform the functions detailed herein. Such special-purpose processors may be Application Specific Integrated Circuits (ASIC)s or Field Programmable Gate Arrays (FPGA)s which are general-purpose components that are physically and electrically configured to perform the functions detailed herein. Such general-purpose processors may execute special-purpose software that is stored using one or more memory resources 124 such as non-transitory processor-readable mediums, including random access memory (RAM), flash memory, a hard disk drive (HDD), or a solid state drive (SSD).

In one embodiment, base station 120 may provide service to a particular cell of a cellular network and may include a 5G New Radio (NR) compliant gNodeB and use a 5G compliant Radio Access Technology (RAT) and Core Mobile Network 170 infrastructure. Core Mobile Network 170 may be in communication with many gNodeBs at a time.

However other RATs and other types of network infrastructure can be used. For example, if system 100 is a 4G Long Term Evolution (LTE) network, the base station 120 may be an eNodeB. Therefore, while mobile communication system 100 in one embodiment implements 5G and gNodeBs, the uplink and downlink on bandwidth part schemes detailed herein are applicable to other types of wireless systems 100, such as a 4G Long Term Evolution (LTE) wireless networks, that uses eNodeBs in place of gNodeBs. Also, system 100 in the described embodiments operates according to the 5G New Radio (NR) radio access technology (RAT). However, in other embodiments, a different RAT may be used, such as 4G Long Term Evolution (LTE), Third Generation (3G) or some other RAT.

An example use case for some embodiments is where the wireless communication system 100 is owned and/or operated by a Mobile Network Operator (MNO) or other wireless system operator. The operator of system 100 (also referred to as the "enterprise" herein) typically directly owns or controls all the elements necessary to sell and deliver wireless services to an end user of UEs 110, including radio spectrum license(s), operation of wireless network infrastructure components, back haul, provisioning systems, billing, and customer care The enterprise may also offer access to the spectrum by other enterprises 180-1, 180-2, . . . 180-$p$. These other enterprises may include Mobile Virtual Network Operators (MVNOs) who provide service to the public, Non-Public Network (NPN) providers, or private organizations such as a corporation, a municipality, a university campus, etc.

UEs 110 are various types of wireless computerized devices. For instance, UEs 110 can be smart phones, cellular phones, laptop computers, tablet computers, gaming devices, smart home devices, Internet of Things (IoT) devices, or any other computerized device configured to use the appropriate RAT to communicate with base station 120.

UEs 110 may also include one or more access points (APs) that further provide network access to one or more other devices. For instance, some devices may be able to communicate wirelessly with an AP via Wi-Fi or Bluetooth or Near Field Communication (NFC). The AP may communicate locally with devices using Wi-Fi and communicate with base station 120 using a different RAT.

As described in more detail below, various functions including BWP Management 130 and UL/DL Resource Management 140 may be provided directly by gNodeB 120, or by Core Mobile Network 170, or some combination of the two, or by a separate function of the providers 180 in communication with Core Mobile Network 170 or gNodeB 120.

More particularly, communications between the base station 120 and UEs 110 may be scheduled. According to 5G Release 18, Physical Resource Blocks (PRBs) may be allocated across the radio bandwidth assigned to a base station 120. Each PRB may define a timeslot on a particular subcarrier frequency. The number of PRBs scheduled for a given base station 120 may depend on the overall bandwidth available to the operator of the system 100 and on the subcarrier spacing (SCS) within that bandwidth.

As mentioned previously, duplex operation can be provided by allowing the coexistence of downlink and uplink resources within the bandwidth of a given Time Division Duplex (TDD) channel. With one approach, the available TDD channel bandwidth is divided into non-overlapping subcarriers, and then timeslots are further assigned as to uplink and downlink functions. In an embodiment herein, the assignment of subcarriers and timeslots to either uplink or downlink may be implemented by UL/DL Resource Management 140.

Figure 2:
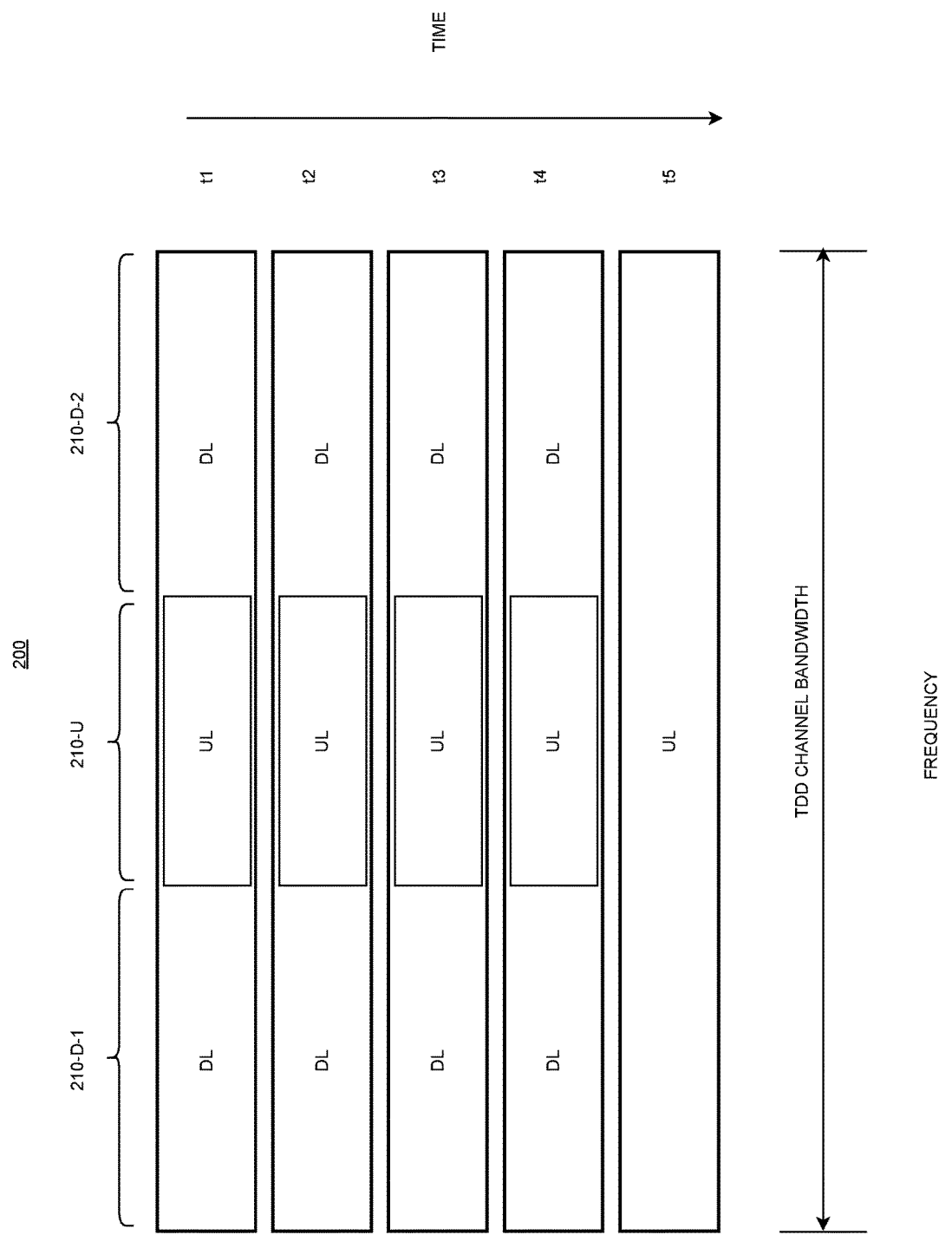
FIG. 2 illustrates a prior art Third Generation Partnership Project (3GPP) Release 18 duplexing evolution scheme to assign uplink and downlink resources.

FIG. 2 shows one example prior art scheme 200 for allocating uplink and downlink subcarriers to provide subband full duplex (SBFD) within a carrier or in multiple aggregated carriers. This particular scheme supports the coexistence of multiple downlink and uplink resources within a TDD channel 220.

Subbands are assigned such that the TDD channel 220 is divided into multiple nonoverlapping subbands, with some subbands designated for uplink and others designated for downlink. In many use cases, such as Internet access, streaming media applications and the like, downlink traffic from the base station 120 to the UEs 110 is greater than uplink traffic from the UEs 110 to the base station 120. Therefore it is advantageous to assign more downlink channels than uplink channels in each timeslot.

In this example implementation, the TDD channel bandwidth 220 available may be within a single radio frequency carrier or may comprise multiple aggregated carriers. The TDD channel bandwidth, in this example, may be 20 MHz which is then divided into 106 PRBs, each 180 kHz wide. During timeslot t1, a first subgroup 210-D-1 of these 106 PRBs is assigned to downlink, a second group of subbands 210-U-1 is assigned to uplink, and a third group of these subbands 210-D-2 is assigned to downlink. In this example, the first group 210-D-1 may include forty (40) PRBs, the second group 210-U may include thirty six (36) PRBs, and the third group 210-D-2 may include the remaining thirty (30) PRBs.

The assignments in timeslots t2, t3, and t4 could be the same as the assignments in timeslot t1. Timeslot t5 is dedicated to uplink only in this scenario.

With this approach, uplink resources in timeslots t1 to t4 are deployed using only the subbands located in the center block of the TDD channel, with downlink resources deployed using the subbands on either side of the center block.

The pattern then could repeat on a semi-persistent fashion for subsequent timeslots after t5.

This approach therefore permits implementing Frequency Division Duplex (FDD) during timeslots t1-t4 (by assigning uplink and downlink resources simultaneously on different subbands in a given timeslot). This is generally the preferred method for communication with UEs located in most areas of a typical cell.

This approach for assignment of uplink and downlink resources also permits implementing Time Division Duplex (TDD), such as by assigning uplink and downlink on the same subband but in different timeslots. FDD can be the preferred approach for UEs that are located on the outer edge of a cell. This is because cell edge devices often operate with limited link budget and at relatively high power, and are more susceptible to interference from other base stations. Cell edge devices are thus more reliant on schemes for improving reception such as by resolving multipath. By implementing both uplink and downlink on the same subcarrier for these cell edge UEs, channel propagation estimates measured on a downlink subband will more accurately reflect necessary adjustments to the transmit parameters for uplink transmissions which occur on the same subband frequency.

Returning attention briefly to FIG. 1, a Bandwidth Part (BWP) Management 130 function may be included the system 100. BWP Management 130 may be implemented for a 5G NR system 100 using the processing and memory resources within gNodeB 120 and/or by processing and memory resources separate from and in communication with gNodeB 120. For other types of networks, BWP Management 130 can also be part of network management (NM) or system-level Radio Resource Management (RRM) functions.

BWP Management 130 configures the base station 120 to divide available TDD channel bandwidth into multiple bandwidth parts (BWPs). The multiple BWPs are then used by the base station 120 concurrently for communication with different pieces of user equipment (UE) 110. The bandwidth of each individual BWP may vary, may be allocated from a single carrier frequency or multiple aggregated carriers, and may be different from the bandwidth assigned to other BWPs. It should also be understood that the same BWP assignment may be used for more than one UE 110 in some instances.

Figure 3:
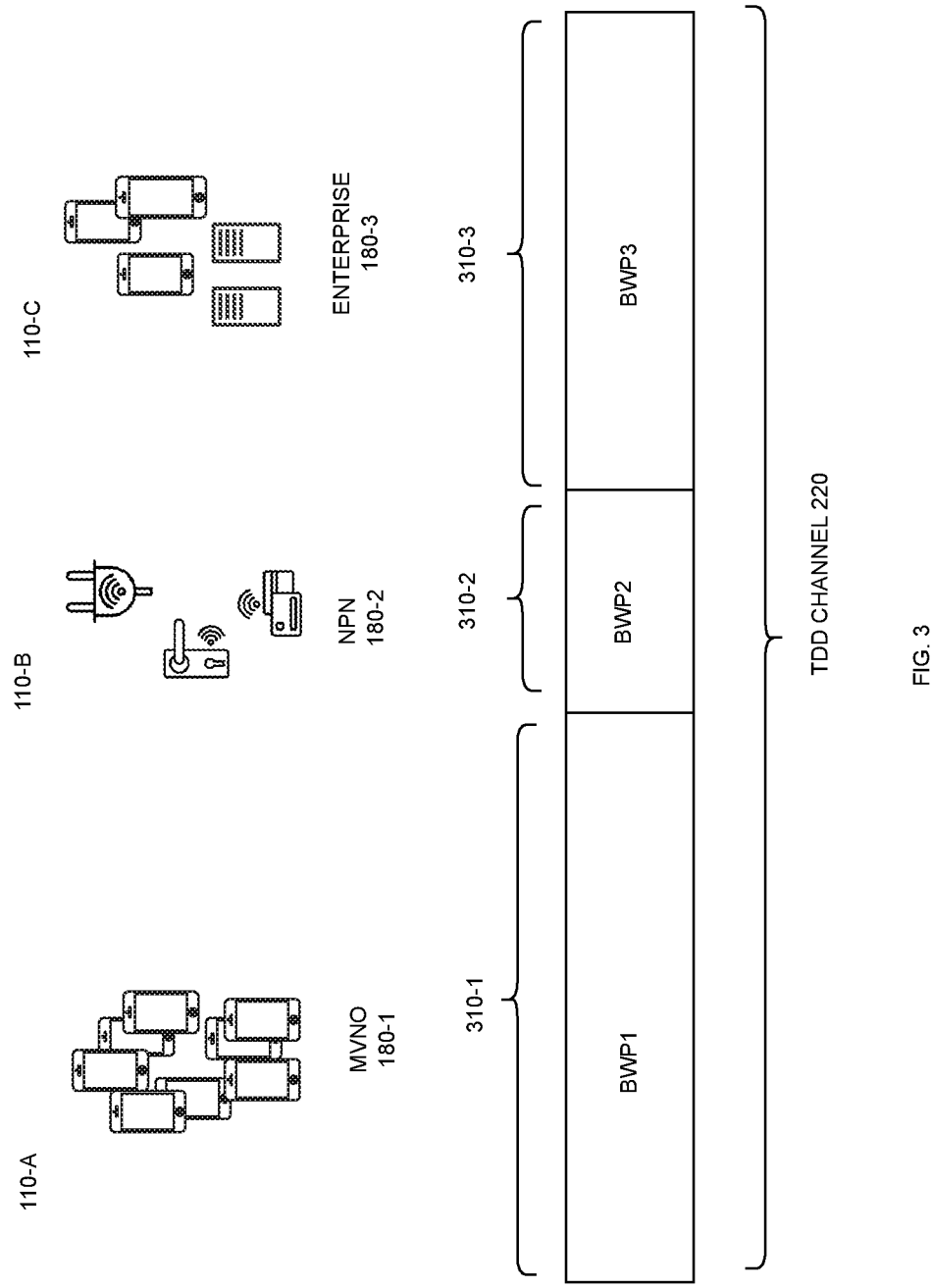
FIG. 3 illustrates assignment of bandwidth parts to different enterprises and/or different classes of user equipment (UE).

FIG. 3 illustrates one way to implement multiple BWPs 310-1, 310-2, 310-3 and then assign uplink and downlink resources within each BWP 310 concurrently.

The general idea here is that an operator of the basestation 120 can define different BWPs 310 within the available channel bandwidth and then map different devices to these different BWPs 310. The ability to assign non-overlapping BWPs 310 can be beneficial, especially for use cases where the network operator is supporting different types of providers 180 that support UEs 110 with different capabilities and needs.

An example BWP1 310-1 may have different subcarrier spacings and a different total bandwidth than a second bandwidth part BWP2 310-2. Also, the system operator may allocate different BWPs to different use cases. For example, BWP1 310-1 may be assigned to support a Mobile Virtual Network Operator (MVNO) 180-1 that provides 5G service to end user's mobile phones, BWP2 310-2 may be assigned to a non-public network (NPN) provider 180-2 that services Internet of Things devices (such as door locks, credit card readers, and light fixtures), and BWP3 310-3 may be assigned to a corporate enterprise 180-3 that provides wireless connectivity between internal file servers and its employee operated UEs 110.

A given BWP 310 can have different bandwidth and different subband bandwidths (subcarrier spacings) than other BWPs 310. In one example for 20 MHz of overall TDD channel bandwidth, BWP1 310-1 may encompass 10 MHz, BWP2 310-2 may include 4 MHz, and BWP3 310-3 may include the remaining 6 MHz. In this example, BWP2 310-2 used by NPN provider 180-2 only needs to service the narrower bandwidth and greater latency of IoT UEs 110-B, whereas BWP1 310-1 used by MVNO 180-1 needs to provide full 5G Advanced Evolution data rates to the mobile phone UEs 110-A that it services.

Figure 4:
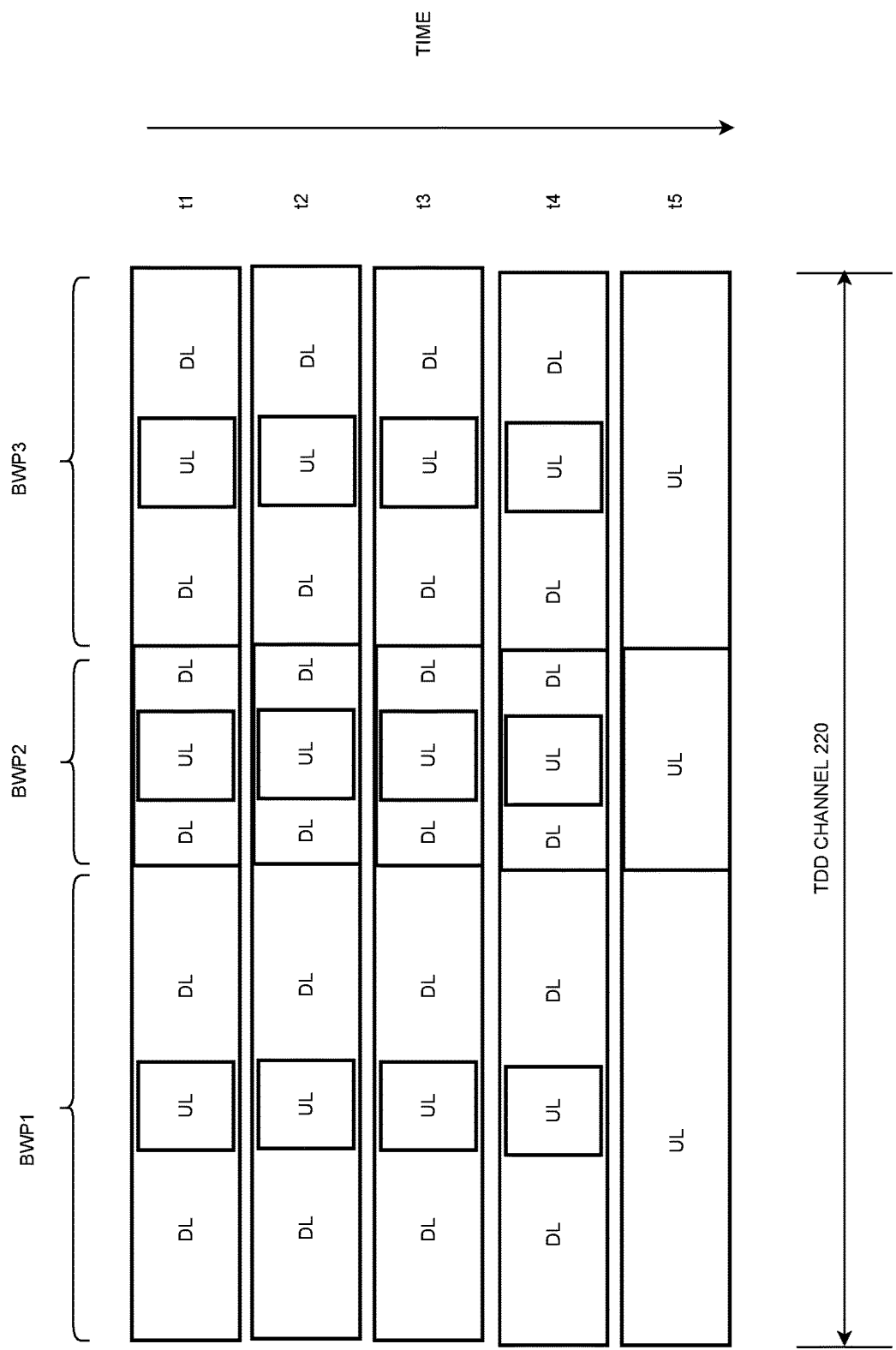
FIG. 4 illustrates assignment of uplink and downlink resources within bandwidth parts.

FIG. 4 illustrates one embodiment of how UL/DL Resource Management 140 may assign uplink and downlink resources within each BWP 310. As shown, BWP1 310-1 is divided into both uplink and downlink subbands during timeslots t1 to t4, and is dedicated to uplink only in timeslot t5. BWP2 310-2 and BWP3 310-3 are assigned uplink and downlink channels from t1 to t4 and uplink only in t5. With this approach, the full advantages of FDD and TDD are available within each BWP 310 and thus for each provider (i.e., MVNO, NPN, etc) 180, separate from an independent of any uplink/downlink assignments for other BWPs 310 or other providers 180. Here the subbands assigned to uplink resources may be selected as a group from a center portion of each BWP 310, with downlink resources selected from the subbands on either side thereof. In this example implementation, up to four (4) download bandwidth parts and up to four (4) upload bandwidth parts may be defined, and a given user equipment may only have one active download bandwidth part and only one active download bandwidth part at a given time. However other arrangements of uplink and downlink subbands within each BWP 310 are possible.

A list 150 (FIG. 1) of each BWP 310 and its respective uplink (UL) and downlink (DL) subbands within that BWP is maintained in the memory resources 124 of the gNode B 120. In some embodiments this list 150 may be entirely determined by the operator. However in other embodiments, one or more of the providers 180 may be enabled to choose how to allocate UL and DL subbands within their assigned BWP, in which case that choice is communicated to the gNodeB 120 for storage in the list 150.

Figure 5:
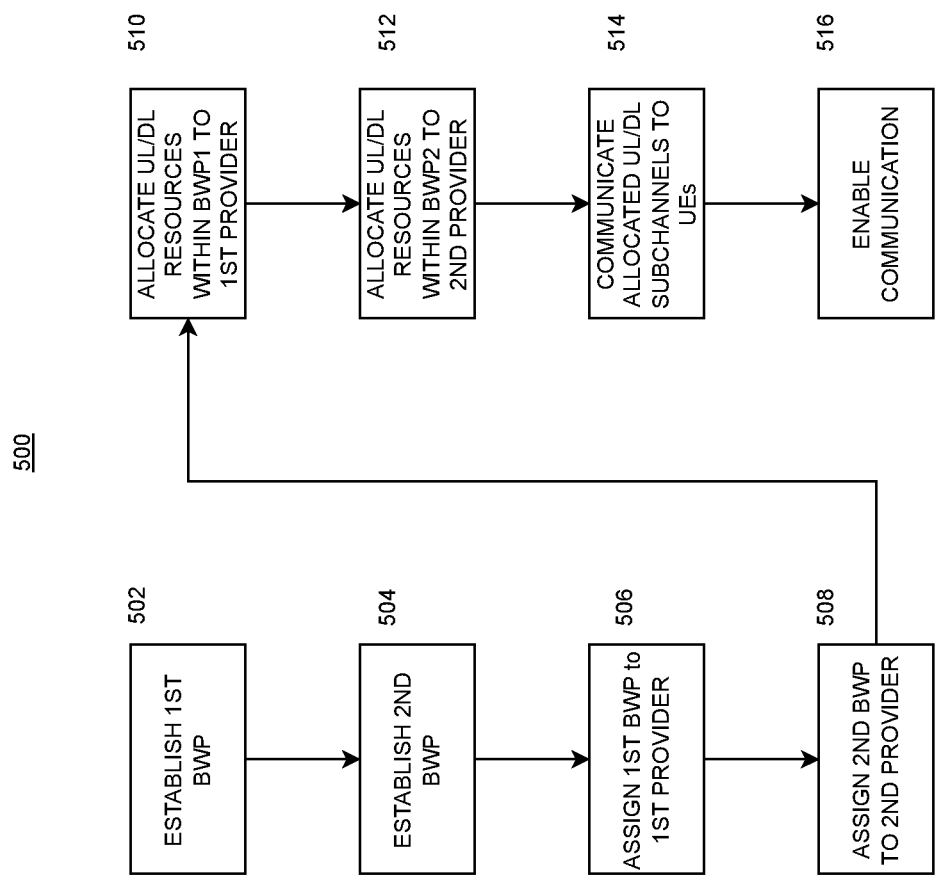
FIG. 5 is a flow diagram of a method for operating a wireless communication system according to one embodiment.

FIG. 5 is a flow diagram of one possible method for operating a wireless communication system to assign uplink and downlink resources within bandwidth parts (BWPs).

In state 502 a first bandwidth part is established.

In state 504 a second bandwidth part is established.

In state 506 the first bandwidth part is assigned to a first provider (i.e., MVNO, NPN, etc).

In state 508 the second bandwidth part is assigned to a second provider (i.e., MVNO, NPN, etc).

States 502 through 508 may be performed by the BWP Management function 130 of FIG. 1 using for example the BWP scheme of FIG. 3.

In a state 510 uplink and downlink resources within the first bandwidth part are assigned to be used for communication by UEs serviced by the first enterprise (i.e., MVNO, NPN, etc). In state 512 uplink and downlink resources within second bandwidth part are assigned to be used by the UEs serviced by the second enterprise (i.e., MVNO, NPN, etc).

These resource assignment functions of states 510 and 512 may be performed by the UL/DL Resource Management 140 of FIG. 1 using for example the uplink and downlink resource assignment plan described in connection with FIG. 4.

In state 514 the parameters of the assigned bandwidth parts, uplink channels, and downlink channels are communicated by the base station 120 to each of the corresponding UEs 110. These parameters may be communicated via Radio Resource Control (RRC) message(s) and may include one or more Scheduling Request (SR) configurations, such as Bandwidth Part (BWP) identifier(s) indicating one or more BWPs, and one or more uplink and downlink resource identifiers that indicate subband frequency(ies), bandwidth(s), and timeslot(s) within each BWP that the UE 110 may use.

Finally in state 516 communication can be enabled between the base station and the UEs 110.

The uplink and downlink scheme depicted in FIG. 4 enables each enterprise to enjoy the advantages of subband full duplex (SBFD) within each BWP 310, without the operator needing to grant access to the entire channel bandwidth to each enterprise or each UE 110.

As a result, enterprises offering 5G service can support UEs that may only operate within a certain limited range of radio frequencies. Such UEs can thus use narrower bandwidth radios, consume less power and therefore cost less.

Also, this approach to uplink and downlink resource assignment permits an MVNO to only need access to say, a 5 MHz wide BWP 310 instead of the entire channel bandwidth 220 licensed by the operator. This limits the amount of bandwidth the MVNO can consume, thus keeping the operator's costs under control, but also enables the MNVO to still provide 5G Release 18 compliant full duplex subband functionality.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may the execute the program code to perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The above description has particularly shown and described example embodiments. However, it will be understood by those skilled in the art that various changes in form and details may be made therein without departing from the legal scope of this patent as encompassed by the appended claims.

The invention claimed is:

1. A method for wireless communication, comprising:
   establishing, by a wireless network, a first bandwidth part to implement wireless communication;
   establishing, by the wireless network, a second bandwidth part to implement wireless communication, the second bandwidth part implemented concurrently with the first bandwidth part, and the second bandwidth part non-overlapping in frequency with the first bandwidth part;
   assigning the first bandwidth part for use by a first group of user equipment;
   assigning the second bandwidth part for use by a second group of user equipment;
   allocating a first uplink resource and a first downlink resource within the first bandwidth part for use by the first group of user equipment, the first uplink resource and first downlink resource each specified by a subband within the first bandwidth part and a timeslot, to thereby enable duplex operation of the first group of user equipment;
   allocating a second uplink resource and a second downlink resource within the second bandwidth part for use by the second group of user equipment, the second uplink resource and second downlink resource each specified by a subband within the second bandwidth part and a timeslot, to thereby enable duplex operation of the second group of user equipment; and
   performing, by a base station, communication with the first group of user equipment using the first bandwidth part and communication with the second group of user equipment using the second bandwidth part.

2. The method of claim 1 wherein an operator of the wireless network determines parameters of the first bandwidth part and the second bandwidth part, the parameters including subband frequencies and subband spacings of each bandwidth part.

3. The method of claim 1 wherein the first bandwidth part is assigned for use by a first enterprise and the second bandwidth part is assigned for use by a second enterprise.

4. The method of claim 3 wherein the first enterprise determines parameters of the first uplink resource and first downlink resource, and wherein the second enterprise determines parameters of the second uplink resource and second downlink resource.

5. The method of claim 1 additionally comprising:
   establishing the first bandwidth part based on one or more predetermined operating frequencies of the first group of user equipment; and
   establishing the second bandwidth part with a different bandwidth than the first bandwidth part, and wherein the second bandwidth part is based on one or more predetermined operating frequencies of the second group of user equipment.

6. The method of claim 5 wherein a subcarrier spacing of the first bandwidth part is different from a subcarrier spacing of the second bandwidth part.

7. The method of claim 1 wherein at least one of the first bandwidth part and second bandwidth part comprise two or more aggregated carriers.

8. The method of claim 1 additionally comprising:
   communicating parameters of the first bandwidth part, first uplink resource and first downlink resource to the first group of user equipment; and
   communicating parameters of the second bandwidth part, second uplink resource and second downlink resource to the second group of user equipment.

9. The method of claim 8 additionally comprising:
   communicating parameters of the first bandwidth part, first uplink resource, first downlink resource is via a first radio resource control (RRC) message; and
   communicating parameters of the second bandwidth part, second uplink resource and second downlink resource is via a second RRC message.

10. The method of claim 1 additionally comprising:
    establishing, by the wireless network, a third bandwidth part to implement wireless communication, the third bandwidth part implemented concurrently with the first and second bandwidth parts, and the third bandwidth part non-overlapping in frequency with both the first and second bandwidth parts;
    assigning the third bandwidth part for use by a third group of user equipment; and
    allocating a third uplink resource and a third downlink resource within the third bandwidth part for use by the third group of user equipment, the third uplink resource and third downlink resource each specified by a subband within the third bandwidth part and a timeslot.

11. A base station apparatus comprising:
    a transceiver configured to transmit and receive signals to and from a plurality of user equipment;
    one or more processors coupled to the transceiver; and
    one or more non-transitory computer readable media including instructions that, when executed by the one or more processors, cause the one or more processors to perform a process including:
    establishing a first bandwidth part to implement wireless communication;
    establishing a second bandwidth part to implement wireless communication, the second bandwidth part implemented concurrently with the first bandwidth part, and the second bandwidth part non-overlapping in frequency with the first bandwidth part;
    assigning the first bandwidth part for use by a first group of the user equipment;
    assigning the second bandwidth part for use by a second group of the user equipment;
    allocating a first uplink resource and a first downlink resource within the first bandwidth part for use by the first group of user equipment, the first uplink resource and first downlink resource each specified by a subband within the first bandwidth part and a timeslot, to thereby enable duplex operation of the first group of user equipment;
    allocating a second uplink resource and a second downlink resource within the second bandwidth part for use by the second group of user equipment, the second uplink resource and second downlink resource each specified by a subband within the second bandwidth part and a timeslot, to thereby enable duplex operation of the second group of user equipment; and
    communicating, via the transceiver, with the first group of user equipment using the first bandwidth part and communication with the second group of user equipment using the second bandwidth part.

12. The apparatus of claim 11 wherein an operator of the base station determines parameters of the first bandwidth part and the second bandwidth part, the parameters including subband frequencies and subband spacings of each bandwidth part.

13. The apparatus of claim 11 wherein the first bandwidth part is assigned for use by a first enterprise and the second bandwidth part is assigned for use by a second enterprise.

14. The apparatus of claim 13 wherein the first enterprise determines parameters of the first uplink resource and first downlink resource, and wherein the second enterprise determines parameters of the second uplink resource and second downlink resource.

15. The apparatus of claim 11 additionally comprising:
establishing the first bandwidth part based on one or more predetermined operating frequencies of the first group of user equipment; and
establishing the second bandwidth part with a different bandwidth than the first bandwidth part, and wherein the second bandwidth part is based on one or more predetermined operating frequencies of the second group of user equipment.

16. The apparatus of claim 15 wherein a subcarrier spacing of the first bandwidth part is different from a subcarrier spacing of the second bandwidth part.

17. The apparatus of claim 11 wherein at least one of the first bandwidth part and second bandwidth part comprise two or more aggregated carriers.

18. The apparatus of claim 11 additionally comprising:
communicating parameters of the first bandwidth part, first uplink resource and first downlink resource to the first group of user equipment; and
communicating parameters of the second bandwidth part, second uplink resource and second downlink resource to the second group of user equipment.

19. The apparatus of claim 18 additionally comprising:
communicating parameters of the first bandwidth part, first uplink resource, first downlink resource is via a first radio resource control (RRC) message; and
communicating parameters of the second bandwidth part, second uplink resource and second downlink resource is via a second RRC message.

20. The apparatus of claim 11 additionally comprising:
establishing a third bandwidth part to implement wireless communication, the third bandwidth part implemented concurrently with the first and second bandwidth parts, and the third bandwidth part non-overlapping in frequency with both the first and second bandwidth parts;
assigning the third bandwidth part for use by a third group of user equipment; and
allocating a third uplink resource and a third downlink resource within the third bandwidth part for use by the third group of user equipment, the third uplink resource and third downlink resource each specified by a subband within the third bandwidth part and a timeslot.

* * * * *